Sept. 5, 1950 J. RUSTON 2,521,482

MEASUREMENT OF PERCENT MODULATION OF VIDEO TRANSMITTERS

Filed Oct. 6, 1948

INVENTOR.
JOHN RUSTON
BY Darby & Darby
ATTORNEYS

Patented Sept. 5, 1950 2,521,482

UNITED STATES PATENT OFFICE 2,521,482

MEASUREMENT OF PER CENT MODULATION OF VIDEO TRANSMITTERS

John Ruston, Fairlawn, N. J., assignor to Allen B. Du Mont Laboratories, Inc., Passaic, N. J., a corporation of Delaware Application October 6, 1948, Serial No. 53,042

3 Claims. (Cl. 332—39)

This invention relates to radio transmitters and particularly to means for measuring the percent modulation of the video carrier of a television transmitter by a display on the screen of a cathode-ray tube.

The standards established by the Federal Communications Commission regarding the transmission of television signals prescribe that negative modulation be employed in the transmission of the picture signal. Maximum white in the picture corresponds to close to zero carrier level. The tips of the synchronizing pulses which are in the "blacker than black" region of the picture corresponds to maximum carrier, black in the picture. The blanking level corresponding to some lower carrier level, is also in the black region.

Video signals are obtained at check points in the video transmitter by rectifying samples of the R. F. voltage present at these points. The video signal so obtained is negative with respect to ground and the instantaneous amplitude thereof is proportional to the instantaneous magnitude of the R. F. voltage. When this signal is displayed on the screen of a cathode-ray oscillograph, only the A. C. wave form of the signal is shown.

It is the object of this invention to provide a method of indicating the level of zero voltage in relation to the A. C. component of the wave form.

Figure 1:
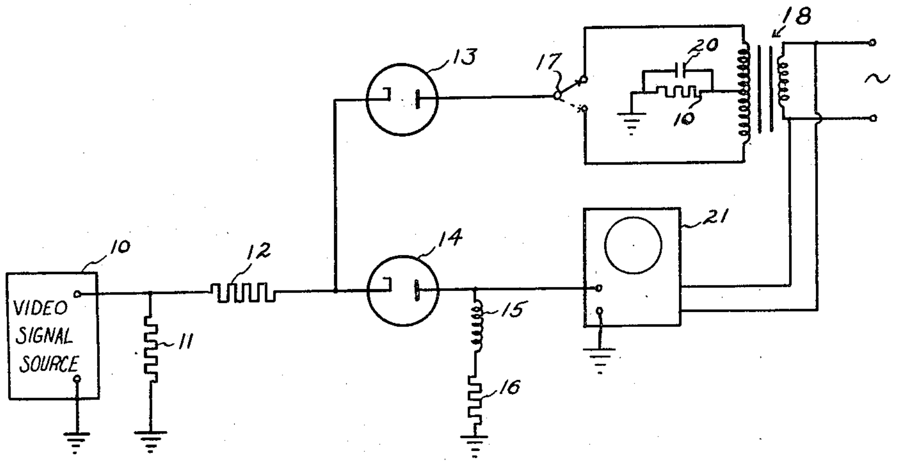
Figure 2:
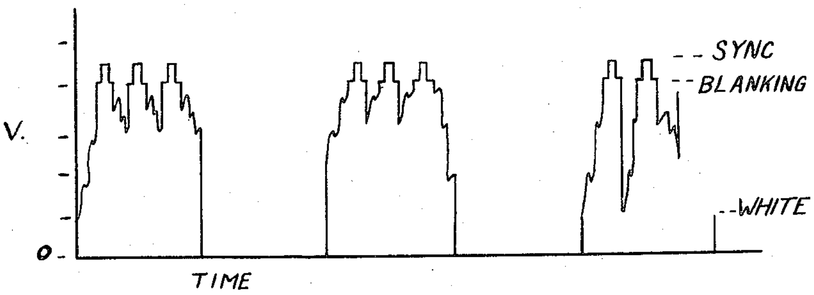

The invention may be understood from the description in connection with the attached drawing in which:

Figure 1 shows a diagrammatic representation of the circuit used in practicing the invention; and Figure 2 shows the wave forms displayed on the screen of the cathode ray tube.

In the drawing there is shown a source 10 of video which may be any portion of the transmitter in which there is a video signal which is desired to be measured. This source 10 is connected across a load resistor 11 and through a series resistor 12 to the common juncture of the cathodes of a pair of rectifiers 13 and 14.

The anode of the rectifier 13 is connected to the center pole of a double throw switch 17. The two outer poles of the switch 17 are connected to the respective ends of the secondary of a power transformer 18. The center of the secondary of the transformer 18 is connected through a parallel circuit comprising a resistor 19 and a capacitor 20 to ground. The primary of the transformer 18 is connected to a source of power which will be the source of power for the transmitter supplying the video signal and which normally will be 110 volts, 60 cycles.

The anode of the second rectifier 14 is connected across an inductance 15 and a resistor 16 in series therewith, to the vertical plate connections of a cathode ray oscillograph 21. The purpose of the inductance 15 is to correct the high frequency characteristics of the oscillograph 21 in the usual or well known manner. The oscillograph 21 receives its power from the same source as the transformer 18 so as to be in synchronism therewith.

The video signal is applied to the junction of resistors 11 and 12 across resistor 11. Since the video signal is negative with respect to ground, it is conducted by rectifier 14 and appears across load resistor 16 and inductor 15 from whence it is applied to the vertical deflecting circuits of the oscillograph 21.

A potential more negative than the video signal is periodically applied by the transformer 18, through the switch 17 to the anode of rectifier 13, so that it conducts no current. At intervals, i. e., on the positive half cycle of the A. C. wave from transformer 18, positive pulses fed to this anode are conducted by the rectifier and returned to ground through the resistors 11 and 12. For the duration of this positive pulse the cathodes of the rectifiers 13 and 14 become positive, rectifier 14 ceases to pass current, and the voltage fed to the oscillograph is zero.

The magnitude and shape of these pulses may be adjusted by changing the values of the resistor 19 and the capacitor 20. The relative polarity of the pulses may be changed by the switch 17.

Since the field frequency of the video signal is synchronous with the power supply frequency at the transmitter, use of the same frequency for the shorting pulses will cause the pattern displayed on the screen of the oscillograph to be stationary (using the internal time base of the oscillograph synchronized with the power line frequency).

The pattern displayed on the screen is shown in Figure 2. The zero voltage level is established by the horizontal trace of the cathode ray tube when no signal is applied to the vertical plates thereof. This is the condition during the period that the rectifier 14 is not conducting. The signal levels above this point appear as indicated. The height of any point on the video wave form above the zero voltage line may be measured and so the relative percent modulation of the transmitter corresponding to white, blanking, and synchronizing pulse tips can be determined. In this figure only a few horizontal pulses are shown for illustrative purposes for clarification, because of the impracticability and confusion which would result if all horizontal pulses in the time cycle were shown, it being understood that in actual practice a larger number of horizontal sync pulses occur during each time cycle. The cathode-ray tube screen may be calibrated in any of the well known ways such as a screen or markings.

While tube rectifiers have been illustrated, it will be apparent that other type rectifiers such as crystal units may be used. Similarly, other modifications will be aparent to those skilled in the art without departing from the scope of the invention.

What is claimed is:

1. In a device for measuring percent modulation of a television transmitter, a pair of rectifiers the cathodes of which are connected together and to a source of video signals of negative polarity and negatively biased, the anode of one of said rectifiers being connected to a source of alternating voltage selectively biased positively or negatively, the anode of the other of said rectifiers being connected across an impedance load to the vertical deflection input circuit of a cathode-ray oscillograph having a horizontal deflection circuit which operates synchronously with said video signal.

2. The device of claim 1 in which said source of alternating voltage comprises a transformer and a shaping network connected to said power line.

3. The device of claim 1 in which a switch is provided to change the phase of said alternating voltage.

JOHN RUSTON.

REFERENCES CITED

The following references are of record in the file of this patent:

UNITED STATES PATENTS

| Number | Name | Date |
|---|---|---|
| 2,266,509 | Percival et al. | Dec. 16, 1941 |
| 2,391,090 | Goldsmith | Dec. 18, 1945 |